United States Patent Office 2,962,528
Patented Nov. 29, 1960

2,962,528

PROCESS FOR PREPARING ALPHA-HALOGLUTARIC ACIDS

William G. Skelly, Northbrook, Ill., assignor to International Minerals & Chemical Corporation, a corporation of New York No Drawing. Filed Aug. 12, 1958, Ser. No. 754,542

5 Claims. (Cl. 260—537)

The present invention relates to the synthesis of alpha-haloglutaric acids. More particularly, it relates to an improved technique for producing alpha-chloroglutaric acid and the like in substantially pure form.

In the synthetic preparation of glutamic acid, a number of methods have been developed which proceed through an alpha-substituted glutaric acid intermediate such as the alpha-haloglutaric acids or the like. Purvis, for example, in U.S. Patent 2,833,786 (May 6, 1958) subjects 3-chlorocyclopentene to ozonization, then oxidizes the ozonide with oxygen, hydrogen peroxide or the like to produce a mixture of alpha-chloroglutaric acid alpha-hydroxyglutaric acid, and alpha-hydroxyglutaric acid lactone, then ammoniates the said mixture at elevated temperature to produce pyrrolidonecarboxylic acid, and finally hydrolyzes to glutamic acid. A modification of the Purvis oxidation technique has now been discovered which permits alpha-haloglutaric acids to be produced in good yield while producing substantially none of the alpha-hydroxyglutaric acid or its lactone.

One object of the present invention is to produce alpha-haloglutaric acids in improved yield.

Another object is to produce alpha-haloglutaric acids substantially free from alpha-hydroxyglutaric acid and its lactone.

Other objects of the invention will be apparent from the following description.

The present invention is an improvement in the oxidative cleavage of 3-halocyclopentene ozonide with hydrogen peroxide. Specifically, it has been found that, when a 3-halocyclopentene ozonide is treated with hydrogen peroxide in the presence of a limited quantity of water, the resulting product comprises the corresponding alpha-haloglutaric acid substantially completely free from alpha-hydroxyglutaric acid and alpha-hydroxyglutaric acid lactone. To achieve this purpose, the $H_2O:H_2O$ weight ratio should be greater than about 0.5:1, preferably above about 0.67:1, and optimally at least about 1:1. The subsequent isolation of the alpha-haloglutaric acid should moreover be carried out without any further addition of water to the reaction system.

Ozonides for use in the present invention are conveniently prepared by passing an ozone-containing gas through a solution, preferably an anhydrous solution, of a 3-halocyclopentene in an organic solvent. Numerous solvents are suitable for this purpose, including halogenated hydrocarbons such as methylene chloride, chloroform, carbon tetrachloride, and the like; naphthenic hydrocarbons such as cyclohexane, ethylcyclohexane, cyclopentane, and the like; lower aliphatic monohydric alcohols such as methanol, ethanol, isopropyl alcohol, n-butyl alcohol, and the like; lower aliphatic fatty acids such as acetic acid, propionic acid, and the like; esters of lower fatty acids and lower alcohols, such as ethyl acetate, propyl acetate, ethyl propionate, and the like; and many others, including any solvent for the 3-halocyclopentene which does not alter the ozonization reaction or undergo serious alteration itself during the ozonization.

For the ozonization, a mixture of air or oxygen with around 2 to 15% of ozone is conveniently bubbled through the solution of 3-halocyclopentene at low temperature. Higher concentrations of ozone may not be completely absorbed, particularly at high flow rates, while lower concentrations tend to prolong the reaction time unnecessarily. The reaction temperature should be below about room temperature, and is preferably below about 0° C., i.e., between about —20 and about —40° C. The introducion of ozone into the solution is continued until ozone appears and/or materially increases in concentration in the exit gases, thus indicating that the 3-halocyclopentene has been substantially completely reacted. The product obtained thereby is conveniently designated as an "ozonide" of 3-halocyclopentene, although its structure has not been determined with certainty.

The resulting ozonide solution is conveniently converted in accordance with the present invention by acidifying with a strong mineral acid such as sulfuric acid, hydrochloric acid, or the like to a pH below about 2, adding an aqueous hydrogen peroxide solution or hydrogen peroxide and water in a proportion to produce a molecular ratio of water to ozonide of at least about 1:1, preferably about 2:1, a molecular proportion of hydrogen peroxide to ozonide of at least about 1:1, and a weight ratio of $H_2O_2$ to $H_2O$ of at least about 0.5:1, optimally at least about 1:1, then thoroughly mixing and allowing the oxidation to go to completion. The reaction is advantageously carried out at elevated temperature up to about 90° C., the oxidation being completed in about 2 to about 4 hours at 90° C. Complete decomposition of the ozonide is indicated by a negative potassium iodide test for active oxygen. The resulting product is conveniently analyzed by chromatographic means, and is found to comprise the corresponding alpha-haloglutaric acid with essentially none of the alpha-hydroxyglutaric acid or alpha-hydroxyglutaric acid lactone.

The alpha-haloglutaric acid is conveniently recovered from the reaction product by evaporation and crystallization, or by extracting with a selective solvent, such as ethyl ether, or by distillation at reduced pressure. Alternatively, the entire reaction product can conveniently be reacted with ammonia to produce pyrrolidonecarboxylic acid under the conditions described in the Purvis patent referred to above. As a further alternative, the crude reaction product can conveniently be employed directly as a source of alpha-haloglutaric acid in any of the various reactions which the latter undergoes, so long as the solvent contained therein does not deleteriously affect the course of the desired reaction.

The present invention is applicable to the treatment of ozonides of 3-chlorocyclopentene, 3-bromocyclopentene, 3-iodocyclopentene, and 3-fluorocyclopentene.

The invention will be more fully understood from the following specific examples.

*Example 1*

Two 20.3-gram portions of 3-chlorocyclopentene were separately ozonized in 200-milliliter portions of methylene dichloride at —40 to —50° C. with a stream of oxygen containing 3 to 4% of ozone. The flow rate of the ozone-containing gas was 30 liters per hour for 10 minutes, then 57 liters per hour for 3 hours. At the end of the ozonization treatment, 80 milliliters of acetic acid were added to each reactor and the methylene dichloride was removed by distillation at reduced pressure. The contents of the two reactors were combined with 120 milliliters of acetic acid containing 5.6 milliliters of concentrated sulfuric acid. Each reactor was then washed with 20 milliliters of acetic acid, and the washings were added to the main body of ozonization product.

To the resulting liquid was added a mixture of 25 milliliters of aqueous 50% hydrogen peroxide and 80 milliliters of glacial acetic acid and the entire mixture was heated at 90° C. for one hour with stirring. The reaction became vigorous at 75–80° C. and occasional cooling was required to hold it at 90° C. The reaction product was allowed to stand over night, and was then reheated to 90° C. over a period of one hour and held at 90° C. for 2½ hours. A potassium iodide test showed that the mixture was free from active oxygen.

The reaction product was cooled in a water bath, and 12 milliliters of 28% ammonium hydroxide were added dropwise at a maximum temperature of 25° C. Ammonium sulfate crystallized out and was filtered off. The liquid phase (458 milliliters) was chromatographed and found to show only a single spot located at the expected position for alpha-chloroglutaric acid. An attempt to decolorize the solution with activated carbon was unsuccessful. The filtrate from the carbon treatment was evaporated under reduced pressure, and was found to crystallize at 50° C. on being cooled. It remelted on being reheated to 70° C.

*Example 2*

3-chlorocyclopentene (30.2 grams) was ozonized in 200 ml. of methylene dichloride at —30 to —50° C., using a stream of oxygen containing 3 to 4% of ozone at a flow rate of 57 liters per hour for 5 hours. To the ozonization product were added 120 milliliters of acetic acid, and the methylene dichloride was distilled off at reduced pressure. The resulting solution was commingled with 120 milliliters of acetic acid containing 4.2 milliliters of concentrated sulfuric acid, then with 22.5 milliliters of 50% hydrogen peroxide in 90 milliliters of glacial acetic acid, and the mixture was heated with stirring for 12 hours at 90° C. Concentrated ammonium hydroxide solution (10.6 milliliters, 28%) was added and the precipitate of ammonium sulfate was filtered off (4.3 grams). The solution was evaporated to 174 grams and a second crop of crystals (2.5 grams) was filtered off. The solution was finally evaporated to constant weight and about 300 milliliters of acetone were added. A third crop of ammonium sulfate, weighing 2.5 grams, was precipitated thereby and was filtered off. The filtrate was again evaporated to constant weight, 51 grams (theory, 49.5 grams). On standing several days, the material solidified in part in the form of hard crystals. The liquid phase was poured off, and the crystals were exposed to air for several days. These crystals had a moleclular weight, determined by titration with standard base, of 170.2, compared with a theoretical molecular weight of 166.5 for alpha-chloroglutaric acid. Both the crystals and the liquid phase, on being chromatographed, showed only a single spot, located at the expected position for alpha-chloroglutaric acid.

The foregoing examples and other references hereinabove to specific details of the invention are to be considered as illustrative only and not by way of limitation. Numerous modifications and equivalents of the invention will be apparent from the foregoing description to those skilled in the art.

The following claims particularly point out and distinctly claim the subject matter of the invention:

1. In a process which comprises cleaving and oxidizing an ozonide of a 3-halocyclopentene under acid conditions with hydrogen peroxide and water, the improvement which comprises effecting said cleavage and oxidation at a molecular ratio of water to said ozonide of at least about 1:1, a molecular ratio of hydrogen peroxide to said ozonide of at least about 1:1, and an $H_2O_2:H_2O$ weight ratio greater than about 0.5:1 and at a pH below about 2, whereby a product is obtained comprising alpha-haloglutaric acid substantially completely free from alpha-hydroxyglutaric acid and alpha-hydroxyglutaric acid lactone.

2. A process as in claim 1 wherein said weight ratio of $H_2O_2$ to $H_2O$ is greater than about 1:1.

3. In a process which comprises cleaving and oxidizing an ozonide of 3-chlorocyclopentene under acid conditions with hydrogen peroxide and water, the improvement which comprises effecting said oxidation at a molecular ratio of water to said ozonide of at least about 1:1, a molecular ratio of hydrogen peroxide to said ozonide of at least about 1:1, and an $H_2O_2$ to $H_2O$ weight ratio of at least about 1:1 and at a pH below about 2, whereby the product comprises alpha-chloroglutaric acid substantially completely free from alpha-hydroxyglutaric acid and alpha-hydroxyglutaric acid lactone.

4. A process as in claim 3 wherein said oxidation is effected with aqueous 50% hydrogen peroxide.

5. A process which comprises cleaving and oxidizing an ozonide of 3-chlorocyclopentene at a pH below about 2 and at an elevated temperature below about 90° C. with hydrogen peroxide in a molecular ratio to said ozonide of at least about 1:1 in the presence of water in a molecular ratio to said ozonide of at least about 1:1, the weight ratio of $H_2O_2$ to $H_2O$ being greater than about 0.5:1, whereby a product is obtained comprising alpha-chloroglutaric acid substantially completely free from alpha-hydroxyglutaric acid and alpha-hydroxyglutaric acid lactone.

References Cited in the file of this patent

UNITED STATES PATENTS 2,833,786    Purvis _____ May 6, 1958